3,255,239
NOVEL PROCESS FOR THE PREPARATION OF INNER SALTS OF N-ALKANE SULFONIC ACIDS
Karl-Josef Gardenier, Dusseldorf-Holthausen, Germany, assignor to Henkel & Cie G.m.b.H., Dusseldorf-Holthausen, Germany, a corporation of Germany
No Drawing. Filed May 18, 1965, Ser. No. 456,802
Claims priority, application Germany, June 20, 1961, H 42,904; May 29, 1962, H 45,922
6 Claims. (Cl. 260—501)

This is a continuation-in-part application of application Serial No. 200,046, filed June 5, 1962, now abandoned.

The invention relates to a novel economical process for the preparation of salts of compounds having an N-alkyl sulfonic acid radical wherein the alkyl radical has 14 to 22 carbon atoms from the corresponding N-alkene compounds which have non-terminal double bonds in high yields.

A variety of processes for the preparation of compounds having an N-alkane sulfonic acid grouping are known but they are uneconomical for various reasons. Aminopropane sulfonic acid has been prepared by the reaction of trimethylene imine with sulfurous acid or by the reaction of γ-bromopropyl-phthalimide with an aqueous solution of sodium sulfite followed by hydrolysis. Another method for producing aminopropane sulfonic acid comprises reacting hydroxypropane sulfonic acid with phosphorous pentachloride to form chloropropane sulfonic acid which is then reacted with ammonia or a primary amine under pressure to form the corresponding aminopropane sulfonic acid. Other aminoalkane sulfonic acids have been produced by heating the corresponding hydroxy acid or its salts with ammonia or a primary aliphatic amine under high pressures.

It is an object of the invention to provide a novel economical process for the preparation of salts of compounds having an N-alkane sulfonic acid grouping wherein the alkane group has 14 to 22 carbon atoms in high yields.

It is another object of the invention to provide a novel process for the preparation of salts of compounds having an N-alkane sulfonic acid grouping wherein the alkane group has 14 to 22 carbon atoms from the corresponding N-alkene compounds having non-terminal double bonds.

These and other objects and advantages of the invention will become obvious from the following detailed description.

The process of the invention for the preparation of inner salts of compounds having an N-alkane sulfonic acid grouping and having the formula

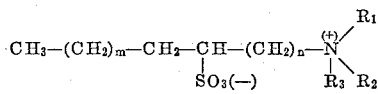

wherein $R_1$ and $R_2$ are selected from the group consisting of hydrogen, alkyl radicals of 1 to 18 carbon atoms and hydroxy alkyl radicals of 2 to 4 carbon atoms, $R_3$ is selected from the group consisting of hydrogen, alkyl radicals of 1 to 4 carbon atoms, hydroxy alkyl of 1 to 4 carbon atoms, carboxyalkyl of 1 to 4 carbon atoms and sulfoalkyl of 1 to 4 carbon atoms and $m+n$ is an integer from 11 to 19, comprises reacting a water-soluble salt of an N-alkene compound which has the formula

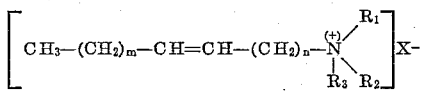

wherein $m$, $n$, $R_1$, $R_2$ and $R_3$ have the above definition and X is selected from the group consisting of halogen, $SO_4H$, $H_2PO_4$ and $SO_4CH_3$ with an aqueous solution of a neutral sulfite selected from the group consisting of an alkali metal sulfite and ammonium sulfite and a bisulfite selected from the group consisting of an alkali metal bisulfite and ammonium bisulfite and having a pH value of 4 to 8 in the presence of a finely divided oxygen containing gas so that a molar excess of the bisulfite is always present to form the corresponding inner salt of a compound having an N-alkane sulfonic acid grouping and recovering the latter.

Examples of suitable starting materials are water-soluble acid addition salts and quaternary ammonium salts of amines of naturally occurring unsaturated fatty acids having 14 to 22 carbon atoms such in natural fats and oils, for example, herring oil, sperm oil, rapeseed oil, tall oil, soybean oil, etc. and amines of other non-terminally unsaturated fatty acids such as myristo-oleic acid, hexadecenic acid, oleic acid, gadoleic acid, erucic acid, their isomers, etc. and amines such as 22-amino-docosene-9. The said amines may be mono- and di-N-substituted with alkyl radicals of 1 to 18 carbon atoms and hydroxy alkyl radicals of 2 to 4 carbon atoms. The latter are formed by reacting the amine with alkylene oxides such as ethylene oxide, propylene oxide or butylene oxide.

The quaternary ammonium salts and the acid addition salts are used as starting materials since the free amines with their long chain alkene radicals are not water soluble and the reaction is effected in an aqueous medium. Examples of suitable acids to form acid addition salts are mineral acids such as hydrogen chloride, hydrogen bromide, hydrogen iodide, sulfuric acid, phosphoric acid, etc. Examples of suitable quaternization agents are alkyl halides of 1 to 4 carbon atoms such as methyl chloride; alkyl halohydrins of up to 4 carbon atoms such as ethylene chlorohydrin; haloalkanoic acids of 2 to 4 carbon atoms such as chloroacetic acid; haloalkane sulfonic acids of 2 to 4 carbon atoms such as chlorohydroxy propane sulfonic acid; and dialkyl sulfates wherein the alkyl groups have 1 to 4 carbon atoms such as dimethyl sulfate, etc.

The reaction can be aided if the starting compounds are not completely soluble in the reaction by dissolving the starting salt in a water-soluble organic solvent such as dioxane, lower alkanols such as methanol, ethanol, isopropanol, etc. before adding them to the reaction mixture or by adding suitable wetting and dispensing agents to the reaction mixture.

The pH range of the aqueous reaction solution may be between 4 and 8 although it is preferred to use a pH of 6 to 7 to obtain the best results. For this reason, it is frequently more desirable to employ the quaternary ammonium salts or acid salts of the N-alkene compounds.

The reaction can be performed at temperatures ranging from 0° to 60° C. without any appreciable effect on the yields. Because the reaction is exothermic, it is usually desirable to initiate the reaction at room temperature and terminate at moderately elevated temperatures such as 35° to 40° C. In small batch operations special cooling is not usually required.

Due to the presence of the oxygen in the reaction mixture, a portion of the sulfite or bisulfite is oxidized into the sulfate. Therefore, it is necessary that the total amount of sulfite-bisulfite amounts to about 10 to 60% above the theoretically required amount to obtain complete reaction with the N-alkene compound.

The reaction according to the present invention may be performed with sulfite-bisulfite solutions of very different concentrations. For practical reasons it is recommended not to work with an excessively dilute solution. It is most advantageous to select the concentration in such a way that after the reaction a 10 to 30% solution of the compound having an N-alkane sulfonic acid grouping is present.

It is also important for a complete reaction of the N-alkene compound with the bisulfite that the oxygen or the oxygen-containing gas such as air be present in the reaction solution in fine distribution without permitting a substantial oxidation of the sulfite into the sulfate. It is recommended to determine the optimum distribution of the oxygen or the oxygen-containing gases in the reaction solution by a few preliminary tests for each case because this distribution may be varied from one case to another depending upon the volume and shape of the reaction vessel, the type of stirrer, the stirring speed, the amount of gas, the addition rate of the N-alkene compound and sulfite and other factors. Since the N-alkene compound does not react with the bisulfite in the absence of oxygen, it is possible to add the N-alkene compound and the bisulfite separately or to combine the two components prior to the reaction.

During the reaction the sulfite-bisulfite mixture should be present in as great an excess as possible over the N-alkene compound. The reaction is, therefore, advantageously performed in a manner such that the N-alkene compound, which is rapidly consumed, and the sulfite-bisulfite solution are added thereto dropwise or in a continuous stream to a portion of the sulfite-bisulfite solution. The condensation of the bisulfite may also be performed continuously adding the N-alkene compound and the sulfite-bisulfite solution to a suitable stirring vessel and withdrawing a corresponding portion of the reaction mixture. In this method of operation it is recommended to introduce the withdrawn solution into another vessel and there to allow it to undergo further reaction for a few minutes accompanied by stirring and introduction of oxygen or oxygen-containing gas.

The recovery of the compounds having an N-alkane sulfonic acid grouping from the aqueous reaction mixtures is very simple. The inorganic salts present in the solutions can be separated practically quantitatively by precipitation with methanol or ethanol, preferably at a pH value of the vicinity of the neutral point. Before separation of the inorganic salts it is advantageous to oxidize the sulfite or bisulfite still present in the solution to the sulfate, for instance, with the aid of hydrogen peroxide. After separation of the inorganic salts, the compounds having an N-alkane sulfonic acid grouping can be crystallized from the concentrated aqueous solution or from aqueous methanol in the form of its inner salt. By the addition of corresponding bases or acids, it is also possible to obtain other salts of the compound having an N-alkane sulfonic acid grouping from the solutions.

The compounds having an N-alkane sulfonic acid grouping of the invention are useful as washing, cleaning and wetting agents and emulsifiers, foam stabilizers for washing agents, and textile assistants.

In the following examples there are described several preferred embodiments to illustrate the invention. However, it should be understood that the invention is not intended to be limited to the specific embodiments.

*Example I*

0.8 liters of an aqueous solution containing 50 gm. of $Na_2SO_3$ and 10 gm. of $NA_2S_2O_5$ were placed in a reaction vessel provided with a gas feed tube and a stirrer, and over a period of 60 minutes a solution of 133 gm. of technical grade oleylamine (iodine no.=102, 0.5 mol) in the form of its quaternary ammonium salt due to reaction with methyl chloride in 500 gm. of water and a solution of 60 gm. of $Na_2S_2O_5$ and 126 gm. of $Na_2SO_3$ in 500 gm. of water were added thereto simultaneously in dropwise fashion. During the addition oxygen at the rate of 5 liters per hour and air at the rate of 3 to 5 liters per hour were dispersed therein. The pH had a value of 6.1 to 6.8 and the temperature was 40° to 45° C. during the addition. After the addition, the stirring and gas addition was continued for 60 minutes.

To separate the organic salts from the solution, the excess sulfite (0.85 mol) was first oxidized into sulfate by addition of hydrogen peroxide. The solution was adjusted to a pH of 7.0 by addition of sodium hydroxide.

The entire solution was then concentrated on a steam bath to about 800 gm. and was admixed with 1 to 1.2 liters of methanol. The inorganic salts were virtually quantitatively precipitated thereby and were separated on a vacuum filter.

The methanolic solution was concentrated on a steam bath, toward the end at about 15 mm. of mercury for a yield of 192 gm. The inner salt of the corresponding aminoalkane sulfonic acid thus obtained still contained 2 to 3% NaCl and about 10% of unreacted quaternary amine salt (hydrogen iodide number=11, chlorine content=2.5%). The reaction product was a solid mass of light brown color and had a sulfation degree of 80 to 90%.

*Example II*

2.0 liters of an aqueous solution containing 66 gm. of $Na_2SO_3$ and 20 gm. of $Na_2S_2O_5$ were placed in the reaction vessel used in Example I. A solution of 500 gm. of water and 260 gm. of sperm oil alkylene trimethyl ammonium chloride (0.62 mol of quaternary amine which contained 58% unsaturated quaternary amine) and a solution of 36 gm. of $Na_2S_2O_5$ and 100 gm. of $Na_2SO_3$ in 500 gm. of water were added simultaneously in a dropwise fashion to the solution over a period of 70 minutes while dispersing oxygen therethrough at a rate of 10 liters per hour. The reaction temperature was 32 to 40° C. and the pH value was 6.5 to 6.9. The reaction was continued for 30 minutes after the addition was completed.

The product was recovered as in Example I except that the solution was concentrated to 700 gm. and 500 cc. of methanol was added to precipitate the inorganic salts. The amino sulfonic acid was a light brown paste being a yield of 274 gm. containing about 6% sodium chloride. The product was 98 to 100% sulfated.

*Example III*

0.8 liters of an aqueous solution, containing 50 gm. of $Na_2SO_3$ and 10 gm. of $Na_2S_2O_5$, were placed into the reaction vessel used in Example I. Acompanied by vigorous stirring, a solution of 196 gm. of the hydrochloride of N,N-diethanol oleylamine, obtained by addition of 2 mols of ethylene oxide to one mol of oleylamine and neutralization with hydrogen chloride, in 500 gm. of water and a solution of 65 gm. of $Na_2SO_3$ and 48 gm. of $Na_2S_2O_5$ in 350 gm. of water were added thereto simultaneously in dropwise fashion over a period of 80 minutes. During the addition oxygen was dispersed therein at a rate of 10 liters per hour. The pH had a value of 6.3 to 7.0, and the temperature during the addition was 30° to 39° C. After the addition, the stirring and gas dispersion was continued for 25 minutes.

The reaction solution was worked up in the same manner as in Example I. The solution was concentrated on a steam bath to about 750 gm. and was admixed with 0.6 liters of methanol. After separation of the inorganic salts the methanolic solution was concentrated to yield 225 gm. of a yellow brown pasty mass, containing about 7% inorganic salts. This product is clearly soluble in water.

*Example IV*

1.0 liters of an aqueous solution, containing 63 gm. of $Na_2SO_3$ and 12 gm. of $Na_2S_2O_5$, were placed into the reaction vessel used in Example I. In the same manner as in Example I, a solution of 237 gm. of a sulpho-betain, obtained from the reaction of N,N-dimethyl brassidic amine with propane sultone, in 600 gm. of water and a solution of 65 gm. of $Na_2S_3O$ and 48 gm. of $Na_2S_2O_5$ in 350 gm. of water were added simultaneously over a period of 75 minutes. During the addition oxygen was dispersed therein at a rate of 10 liters per hour. The pH had a value of 6.4 to 7.1, the reaction temperature during the addition was 29° to 38° C. Stirring and gas dispersion were continued for 30 minutes after the addition.

The reaction solution was worked up in the same manner as in Example I. After concentration of the reaction solution to about 700 gm., 0.3 liter of methanol were added for separation of the inorganic salts. The methanolic solution of the reaction product was concentrated to yield 285 gm. of a pasty light brown mass, which was very soluble in water.

Example V 0.8 liter of an aqueous solution, containing 50 gm. of $Na_2SO_3$ and 10 gm. of $Na_2S_2O_5$, were placed in the reaction vessel used in Example I. A solution of 130 gm. of the hydrogen sulfate of a tetradecylene amine, obtained from the decylenic acid of sperm oil, in 400 gm. of water and a solution of 65 gm. of $Na_2SO_3$ and 48 gm. of $Na_2S_2O_5$ in 350 ml. of water were added simultaneously over a period of 60 minutes. During the addition a mixture of oxygen and air in the volume ratio of 1:1 was dispersed in the reaction mixture at a rate of 20 liters per hour. The pH had a value of 6.3 to 7.0, the reaction temperature during the addition was 29° to 41° C. Stirring and gas dispersion were continued for 30 minutes after the addition. Working up in the same manner as described before yielded 132 gm. of a yellow pasty mass, very soluble in water.

Example IV

To 1.0 liter of an aqueous solution, containing 63 gm. of $Na_2SO_3$ and 12 gm. of $Na_2S_2O_5$, were added simultaneously over a period of 80 minutes a solution of 216 gm. of dimethyl butyl oleyl ammonium bromide, obtained by quaternization of dimethyl oleyl amine with butyl bromide, in 500 gm. of water and a solution of 65 gm. of $Na_2SO_3$ and 48 gm. of $Na_2S_2O_5$ in 350 ml. water. Oxygen was dispersed therein at a rate of 10 liters per hour. The pH had a value of 6.2 to 7.0. The reaction temperature was 30° to 38° C. Stirring and oxygen dispersion were continued for 30 minutes after the addition. Working up yielded 221 gm. of a light brown pasty mass, soluble in water and containing some sodium bromide.

Example VII

To 0.8 liter of an aqueous solution, containing 50 gm. of $Na_2SO_3$ and 10 gm. of $Na_2S_2O_5$, were added simultaneously over a period of 70 minutes a solution of 178 gm. of ethanol dimethyl oleyl ammonium chloride, obtained from dimethyl oleyl amine by quaternization with ethylene chlorohydrin, in 500 gm. of water and a solution of 65 gm. of $Na_2SO_3$ and 48 gm. of $Na_2S_2O_5$ in 350 gm. of water. Oxygen was dispersed in the reaction mixture at a rate of 10 liters per hour. The pH had a value of 6.1 to 6.9. The reaction temperature during the addition was 31° to 37° C. Stirring and oxygen dispersion were continued for 35 minutes after the addition.

After concentration of the reaction mixture to 730 gm. there were added 0.5 liter of methanol. The solution was filtered and concentrated to yield 203 gm. of a light brown pasty product, soluble in water.

Example VIII

To 1.0 liters of an aqueous solution of 63 gm. of $Na_2SO_3$ and 12 gm. of $Na_2S_2O_5$ were added as described before simultaneously over a period of 80 minutes a solution of 179 gm. of oleyl trimethyl ammonium methylsulfate, obtained by quaternization of oleyl dimethyl amine with dimethyl sulfate, in 450 gm. of water and a solution of 65 gm. of $Na_2SO_3$ and 48 gm. of $Na_2S_2O_5$ in 400 gm. of water. Oxygen was dispersed therein at a rate of 10 liters per hour. The pH had a value of 6.2 to 7.1. The reaction temperature was 30° to 36° C. Stirring and oxygen dispersion were continued for 30 minutes after the addition.

Working up yielded 187 gm. of a pasty brown sulphobetain, very soluble in water, containing about 1% of inorganic salts.

Example IX

To 1.0 liter of an aqueous solution of 66 gm. of $Na_2SO_3$ and 13 gm. of $Na_2S_2O_5$ were added simultaneously over a period of 75 minutes a solution of 176 gm. of a betain, obtained from the reaction of oleyl dimethyl amine and chloroacetic acid, in 600 gm. of water and a solution of 67 gm. of $Na_2SO_3$ and 47 gm. of $Na_2S_2O_5$ in 400 gm. of water. Oxygen was dispersed therein at a rate of 10 liters per hour. The pH had a value of 6.2 to 7.0. The reaction temperature was 29° to 35° C. Stirring and dispersion of oxygen were continued for 40 minutes after the addition.

Working up in the described manner yielded 233 gm. of a yellow pasty mass, which is very soluble in water.

Various modifications of the process of the invention may be made without departing from the spirit or scope thereof and it is to be understood that the invention is to be limited only as defined in the appended claims.

I claim:

1. A process for the preparation of inner salts of compounds having an N-alkane sulfonic acid grouping and having the formula

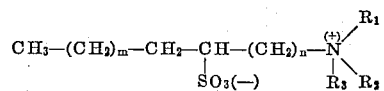

wherein $R_1$ and $R_2$ are selected from the group consisting of hydrogen, alkyl radicals of 1 to 18 carbon atoms and hydroxy alkyl radicals of 2 to 4 carbon atoms, $R_3$ is selected from the group consisting of hydrogen, alkyl radicals of 1 to 4 carbon atoms, hydroxy alkyl of 1 to 4 carbon atoms, carboxyalkyl of 1 to 4 carbon atoms and sulfoalkyl of 1 to 4 carbon atoms and $m+n$ is an integer from 11 to 19, which comprises reacting a water-soluble salt of an N-alkene compound which has the formula

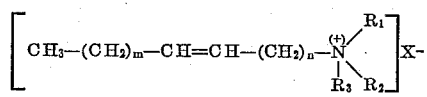

wherein $m$, $n$, $R_1$, $R_2$ and $R_3$ have the above definition and X is selected from the group consisting of halogen, $SO_4H$, $H_2PO_4$ and $SO_4CH_3$ with an aqueous solution of a neutral sulfite selected from the group consisting of an alkali metal sulfite and ammonium sulfite and a bisulfite selected from the group consisting of an alkali metal bisulfite and ammonium bisulfite and having a pH value of 4 to 8 in the presence of a finely divided oxygen containing gas so that a molar excess of the bisulfite is always present to form the corresponding inner salt of a compound having an N-alkene sulfonic acid grouping and recovering the latter.

2. The process of claim 1 wherein the water-soluble salt of the N-alkene compound is the quaternary ammonium salt of oleylamine and methyl chloride.

3. The process of claim 1 wherein the water-soluble salt of the N-alkene compound is sperm oil alkylene trimethyl ammonium chloride.

4. The process of claim 1 wherein the reaction is conducted at a pH of 6 to 7.

5. The process of claim 1 wherein the reaction is initiated at room temperature.

6. The process of claim 1 wherein the sulfite-bisulfite solution is present in a 10 to 60% excess above the theoretical amount.

References Cited by the Examiner

UNITED STATES PATENTS 3,170,951   2/1965   Sheers et al. _____ 260—513

LORRAINE A. WEINBERGER, *Primary Examiner.*

B. M. EISEN, *Assistant Examiner.*